United States Patent
Hall et al.

(10) Patent No.: US 12,502,614 B2
(45) Date of Patent: Dec. 23, 2025

(54) SYSTEM AND METHOD FOR AMUSEMENT ATTRACTION INTERFERENCE DETECTION

(71) Applicant: Universal City Studios LLC, Universal City, CA (US)

(72) Inventors: Gregory Shellman Hall, Orlando, FL (US); Shelby Nicole Honea, Orlando, FL (US); Andrew Carbonar, Orlando, FL (US); Gregory Paul Habiak, Orlando, FL (US); Jose Andres Reyna Perez, Oviedo, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 420 days.

(21) Appl. No.: 18/142,976

(22) Filed: May 3, 2023

(65) Prior Publication Data

US 2024/0367062 A1   Nov. 7, 2024

(51) Int. Cl.
*A63G 31/00* (2006.01)

(52) U.S. Cl.
CPC .................... *A63G 31/00* (2013.01)

(58) Field of Classification Search
CPC ...................................... A63G 31/00
USPC ............................................ 472/3
See application file for complete search history.

(56) References Cited

U.S. PATENT DOCUMENTS

| | | |
|---|---|---|
| 8,141,495 B2 | 3/2012 | Baker et al. |
| 9,067,671 B2 | 6/2015 | Stark et al. |
| 9,216,745 B2 | 12/2015 | Beardsley et al. |
| 9,352,834 B2 | 5/2016 | Davies |
| 9,433,870 B2 | 9/2016 | Blum et al. |
| 10,362,293 B2 | 7/2019 | Mesher |
| 10,453,260 B2 | 10/2019 | Alaniz et al. |

(Continued)

FOREIGN PATENT DOCUMENTS

WO    2023167826 A1    9/2023

OTHER PUBLICATIONS

Songwei Li et al., Beyond Visual Line of Sight UAV Control for Remote Monitoring using Directional Antennas, 2019 IEEE Globecom Workshops (GC Wkshps), Dec. 9, 2019, pp. 1-6, IEEE.

(Continued)

*Primary Examiner* — Allyson N Trail
(74) *Attorney, Agent, or Firm* — Fletcher Yoder, PC

(57) ABSTRACT

An amusement park attraction system includes one or more travel paths configured to guide one or more ride vehicle assemblies thereon. The amusement park attraction system also includes an interference detection assembly comprising one or more drones, a sensor assembly disposed on the drone, one or more memories, and one or more processors. The one or more memories include instructions stored thereon. The one or more processors are configured to execute the instructions to control a path of the one or more drones relative to the one or more travel paths, receive sensor data from the sensor assembly and corresponding to an environment surrounding the one or more drones, detect an overlap between a reach envelope corresponding the one or more ride vehicle assemblies and at least one additional component of the amusement park attraction system based on the sensor data, and generate one or more notifications indicative of the overlap.

20 Claims, 9 Drawing Sheets

(56) References Cited

U.S. PATENT DOCUMENTS

| | | |
|---|---|---|
| 10,616,557 B2 | 4/2020 | Mesher |
| 10,898,601 B2* | 1/2021 | Majdali ................ A61L 2/24 |
| 2021/0084264 A1 | 3/2021 | Jeromin |
| 2021/0157004 A1 | 5/2021 | Graham et al. |
| 2023/0090805 A1* | 3/2023 | Williams ............ G06F 3/011 |
| 2023/0226459 A1* | 7/2023 | Smith ................ A63G 31/00 |
| | | 472/61 |
| 2024/0001250 A1* | 1/2024 | Boyle ................ A63G 31/16 |
| 2024/0230905 A1* | 7/2024 | Siemer .............. G05D 1/0219 |

OTHER PUBLICATIONS

Improved Shadow® Tactical Unmanned Aircraft Systems, https://www.textronsystems.com/products/improved-shadow-tactical-unmanned-aircraft-systems#related-resources.

TS US Nightwarden Datasheet, 2017-2019, pp. 1-2, AAI Corporation Unmanned Systems Hunt Valley, MD.

Universal Ground Control Station, https://www.textronsystems.com/products/universal-ground-control-station.

Air Systems Universal Ground Control Station, 2022, pp. 1-2, AAI Corporation Unmanned Systems Hunt Valley, MD.

The Aerosonde UAS from Textron Systems Supports Wildfire Efforts in Idaho, https://insideunmannedsystems.com/the-aerosonde-uas-from-textron-systems-supports-wildfire-efforts-in-idaho/, Oct. 12, 2015.

PCT/US2024/027067 International Search Report and Written Opinion mailed Jul. 30, 2024.

* cited by examiner

SYSTEM AND METHOD FOR AMUSEMENT ATTRACTION INTERFERENCE DETECTION

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Entertainment venues, such as theme or amusement parks, have been created to provide guests with various immersive experiences. These entertainment venues may include various attractions, such as rides (e.g., rollercoasters), shows, games, and the like, that employ a movable ride vehicle assembly configured to receive one or more of the guests of the entertainment venue. In certain instances, the attraction may also include a show element scheduled to move at pre-determined ride intervals (e.g., to coordinate with movement of the ride vehicle assembly) to enhance an immersive experience of the one or more guests.

During traditional manufacturing, inspection, and/or testing of such an attraction, steps may be taken to determine whether the movable ride vehicle assembly comes within an undesirable proximity to another component of the attraction, such as the show element. Unfortunately, traditional steps for identifying the undesirable proximity are cumbersome, time consuming, inaccurate, and/or expensive. Accordingly, it is now recognized that improved inspection and testing of amusement park attractions are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, an amusement park attraction system includes one or more travel paths configured to guide one or more ride vehicle assemblies thereon. The amusement park attraction system also includes an interference detection assembly comprising one or more drones, a sensor assembly disposed on the drone, one or more memories, and one or more processors. The one or more memories include instructions stored thereon. The one or more processors are configured to execute the instructions to control a path of the one or more drones relative to the one or more travel paths, receive sensor data from the sensor assembly and corresponding to an environment surrounding the one or more drones, detect an overlap between a reach envelope corresponding the one or more ride vehicle assemblies and at least one additional component of the amusement park attraction system based on the sensor data, and generate one or more notifications indicative of the overlap.

In an embodiment, an interference detection system for an amusement park attraction includes one or more drones having a sensory assembly disposed thereon, one or more memories storing instructions thereon, and one or more processors configured to execute the instructions to perform various functions. The functions include controlling a pre-programmed path of the one or more drones relative to one or more ride paths of the amusement park attraction. The functions also include receiving, from the sensor assembly, sensor data corresponding to an environment surrounding the one or more drones. The functions also include detecting, based on the sensor data and additional data indicative of a reach envelope of one or more ride vehicle assemblies configured to traverse the one or more ride paths, one or more interferences between the reach envelope and one or more additional components of the amusement park attraction.

In an embodiment, one or more tangible, non-transitory, computer-readable media store instructions thereon that, when executed by one or more processors, are configured to cause the one or more processors to perform various functions. The functions include controlling a path of one or more vehicles relative to one or more paths. The functions also include receiving, from a sensor assembly disposed on the one or more vehicles, sensor data corresponding to an environment surrounding the one or more vehicles. The functions also include detecting, based on the sensor data and reach envelope data indicative of a reach envelope corresponding to one or more additional vehicles, one or more interferences between the reach envelope and at least one structure adjacent the one or more paths. The functions also include generating one or more notifications indicative of the one or more interference.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
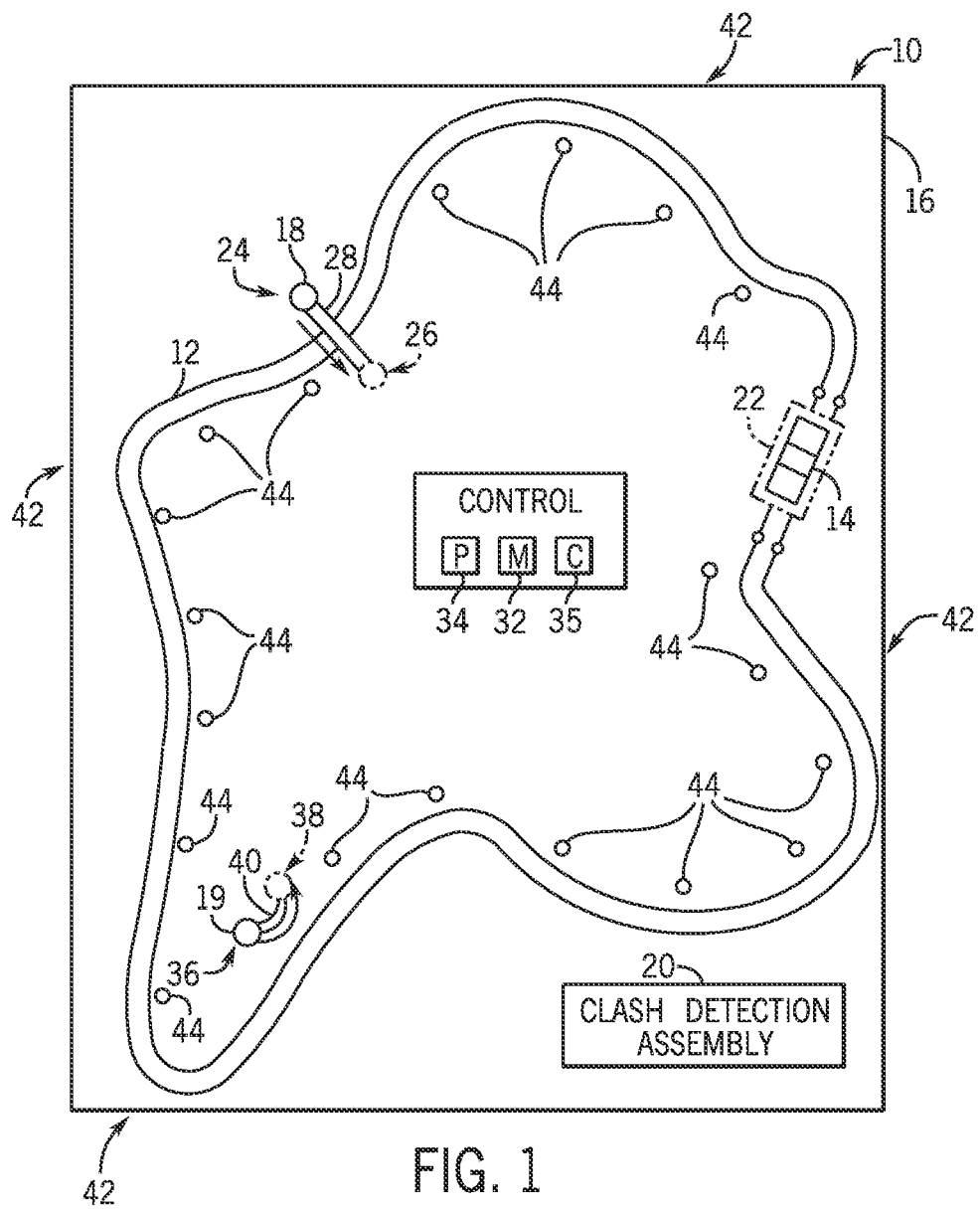
FIG. 1 is a schematic overhead view of a ride system having a track, a ride vehicle assembly configured to move along the track, a stationary structure, and movable show elements, and an interference detection assembly configured to detect an overlap between a reach envelope corresponding to the ride vehicle assembly and an additional component of the ride system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to inspection and/or testing of amusement park attractions, such as a ride system. More particularly, the present disclosure relates to an interference detection assembly configured to identify an overlap between a reach envelope corresponding to a ride vehicle assembly of the amusement park attraction and an additional component of the amusement park attraction, such as a movable show element or stationary structure, based on sensor data (e.g., imaging data from one or more cameras, one or more light detection and ranging (LIDAR) sensors, one or more radio detection and ranging (RADAR) sensors, Infrared (IR) sensors, acoustic sensors, fluid sensors, other types of imaging sensors, or any combination thereof) obtained by a drone. When such an overlap is detected, an interference is detected. That is, an interference may be defined as an overlap between the reach envelope associated with a ride vehicle assembly and a different component of an amusement park attraction that could potentially result in undesired contact (e.g., contact between the ride vehicle assembly and an attraction feature).

In accordance with the present disclosure, an amusement park attraction (e.g., a ride system) includes a ride path (e.g., a track) and a ride vehicle assembly configured to move along the track. The amusement park attraction may also include a stationary structure (e.g., walls of a building), a movable show element, or both. On the one hand, care must be taken (e.g., prior to opening of the amusement park attraction to guests) to ensure that the amusement park attraction is designed such that ride vehicle assembly will not come within an undesirable proximity to at least one additional component of the amusement park attraction, such as the stationary structure and/or the movable show element. On the other hand, an immersive experience of a guest in the ride vehicle assembly may be improved if the ride vehicle assembly comes within a desirable proximity of the at least one additional component (e.g., where the desirable proximity is slightly larger than the undesirable proximity.

In an embodiment of the present disclosure, an interference detection assembly may be employed to identify an overlap (or interference) between a reach envelope corresponding to the ride vehicle assembly and the at least one additional component of the amusement park attraction. It should be noted that the interference detection assembly may be operated to detect any such overlaps without having to run the ride vehicle assembly along the track during operation of the interference detection assembly. That is, the reach envelope corresponding to the ride vehicle assembly may be a hypothetical volume known to the interference detection assembly, and data indicative of the reach envelope may be employed by the interference detection assembly to identify an undesirable position of the additional component (e.g., stationary structure, movable show element) of the amusement park attraction described above.

The reach envelope, described in detail with reference to the drawings, may correspond to a volume that is greater than that of the ride vehicle assembly. For example, a boundary of the reach envelope may be defined be distances (e.g., safety margins) away from the ride vehicle assembly, including a body of the ride vehicle assembly, seats of the ride vehicle assembly, etc. The distances (e.g., safety margins) may also account for a largest possible reach of passengers within the ride vehicle assembly (e.g., including extensions of personal items such as cell phones, cameras, etc.).

With the ride vehicle assembly removed from the track of the amusement park attraction, a path (e.g., land path, air path, water path, space path) of a drone of the interference detection assembly may be controlled to cause the drone to travel substantially along a centerline of the track, to maintain a substantially constant distance from the track, or both. A sensor assembly, such as one or more cameras, one or more light detection and ranging (LIDAR) sensors, one or more radio detection and ranging (RADAR) sensors, or any combination thereof may be disposed on the drone and configured to capture sensor data of an environment surrounding the drone as the drone is controlled to move along the path.

Processing circuitry of the interference detection assembly may be configured to execute instructions stored on memory circuitry of the interference detection assembly to identify, based on the sensor data and additional data indicative of the reach envelope, an overlap (or interference) between the additional component (e.g., stationary structure, movable show element) of the amusement park attraction and the reach envelope. Further, the processing circuitry may determine an extent of the overlap, such as a width of the overlap, a height of the overlap, a length of the overlap, a volume of the overlap, or any combination thereof. A control device of the interference detection assembly may output an indication of the overlap between the additional component of the amusement park attraction and the reach envelope. In some embodiments, the indication may include information indicative of the extent of the overlap described above.

As previously described, the additional component may be the stationary structure, the movable show element, or the like. The stationary structure, for example, may be walls of a building defining or residing within a space in which the amusement park attraction (e.g., a "dark ride") is disposed. In some embodiments, the processing circuitry of the interference detection assembly may generate a recommendation for remedying the overlap of the reach envelope with the stationary structure by moving or re-sizing the track, the ride vehicle assembly, the stationary structure, or both. The movable show element, for example, may be programmed to move (e.g., via electronic actuation, mechanical actuation, or both) at certain ride sequences, such as when the ride vehicle assembly is approaching the movable show element, to improve an immersive experience for the guest(s) that are within the ride vehicle assembly. In some embodiments, the processing circuitry of the interference detection assembly may generate a recommendation for remedying the overlap of the reach envelope with the movable show element by changing a timing of a movement of the movable show element, moving or re-sizing the track, the ride vehicle assembly, and/or the movable show element, or any combination thereof. Any of the above-described recommendations may be presented on the display of the control device of the interference detection assembly.

Presently disclosed embodiments of the interference detection assembly enable improved detection of overlaps (or interferences) between a reach envelope corresponding to a ride vehicle assembly of an amusement park attraction (e.g., prior to installation of the ride vehicle assembly on a track of the amusement park attraction and/or prior to opening of the amusement park attraction to guests). For example, presently disclosed embodiments may enable less cumbersome interference detection, less time-consuming interference detection, more accurate interference detection, and/or more cost-effective interference detection. These and other features will be described in detail below with reference to the drawings.

FIG. 1 is a schematic overhead view of an embodiment of an amusement park attraction (or ride system) 10, referred to below as a ride system, having a track 12, a ride vehicle assembly 14 (e.g., a ride vehicle train) configured to move along the track 12, a stationary structure 16 (e.g., walls of a building), a first movable show element 18, and a second movable show element 19. In accordance with the present disclosure, an interference detection assembly 20 is configured to detect an overlap (or interference) associated with the ride vehicle assembly 14 and an additional component of the ride system 10. For example, the interference detection assembly 20 may be configured to detect an overlap between a reach envelope 22 corresponding to the ride vehicle assembly 14 and the stationary structure 16, the first movable show element 18, the second movable show element 19, or some other component of the ride system 10.

The ride vehicle assembly 14 is shown in the illustrated embodiment for purposes of clarity and may not necessarily be present for operation of the interference detection assembly 20. It should be understood that the interference detection assembly 20 may be operated to detect the overlap (or interference) between the reach envelope 22 corresponding to the ride vehicle assembly 14 and the additional component of the ride system 10. This may occur while the ride vehicle assembly 14 is removed from the track 12 (e.g., prior to installation of the ride vehicle assembly 14 on the track 12, prior to opening of the ride system 10 to guests, during maintenance of the ride system 10, etc.). Further, while the reach envelope 22 will be described in detail with reference to later drawings, in general, the reach envelope 22 may correspond to a volume that is greater than that of the ride vehicle assembly 14. For example, a boundary of the reach envelope 22 may be defined by distances (e.g., safety margins) away from the ride vehicle assembly 14, including a body of the ride vehicle assembly 14, seats of the ride vehicle assembly 14, etc. The distances (e.g., safety margins) may also account for the largest possible reach of passengers within the ride vehicle assembly 14 (e.g., including extensions of personal items such as cell phones, cameras, etc.).

In general, as described above, the interference detection assembly 20 is configured to detect an overlap between the reach envelope 22 and the additional component of the ride system 10 (e.g., the stationary structure 16, the first movable show element 18, the second movable element 19, etc.). For example, a drone of the interference detection assembly 20 may be programmed to travel along a path corresponding to the track 12 (e.g., substantially along a centerline of the track 12, at a substantially constant distance of the track 12, etc.). That is, the path of the drone may substantially mimic a ride path of the ride vehicle assembly 14 along the track 12. It should be noted that the path of the drone may correspond to a land path, an air path, a water path, or a space path.

The drone may include a sensor assembly configured to capture sensor data (e.g., imaging data from one or more cameras, one or more light detection and ranging (LIDAR) sensors, one or more radio detection and ranging (RADAR) sensors, Infrared (IR) sensors, acoustic sensors, fluid sensors, other types of imaging sensors, or any combination thereof) of an environment about the drone (e.g., of the stationary structure 16, the first movable show element 18, the second movable show element 19, or any combination thereof). Processing circuitry of the interference detection assembly 20 may identify an overlap (or interference) between the additional component of the ride system 10 (e.g., the stationary structure 16, the first movable show element 18, or the second movable show element 19) and the reach envelope 22 based on the sensor data and additional data indicative of the reach envelope 22. In some embodiments, the processing circuitry may detect an extent of the overlap, such as a height of the overlap, a width of the overlap, a length of the overlap, a volume of the overlap, or any combination thereof. Further, a display of a control device of the interference detection assembly 20 may output (e.g., illustrate) a notification indicating the overlap and/or the extent of the overlap.

In some embodiments, the processing circuitry of the interference detection assembly 20 may be configured to generate a recommendation for remedying the overlap between the reach envelope 22 and the additional component of the ride system 10. Indeed, in certain circumstances, the overlap may be remedied by re-positioning and/or re-sizing the track 12, the ride vehicle assembly 14 (and, thus, the corresponding reach envelope 22), the additional component (e.g., the stationary structure 16, the first movable show element 18, or the second movable show element 19), or any combination thereof. Further, if an overlap is detected between the reach envelope 22 and one of the movable show elements 18, 19, the overlap may be remedied by changing a timing of movement of the movable show element 18, 19 at issue.

As an example, the first movable show element 18 may be configured to move from a first position 24, across the track 12, and to a second position 26. A linear belt or rail 28 (e.g., overhead linear belt or rail, which may be electronically actuated) may be employed to enable movement of the first movable show element 18 between the first position 24 and the second position 26. Further, a controller 30 including a memory 32 (e.g., memory circuitry), a processor 34 (e.g., processing circuitry), and communication systems 35 (e.g., communication circuitry) of the ride system 10 may be employed to control the movement of the first movable show element 18 from the first position 24 to the second position 26 at a pre-determined time interval and/or based on a position of the ride vehicle assembly 14 relative to the first movable show element 18. Although the communication system 35 (e.g., communication circuitry) is illustrated as a part of the controller 30 in FIG. 1, componentry of the communication system 35 may be distributed through multiple distinct or remote components in certain embodiments. For example, various communication systems in accordance with the present disclosure may be employed to facilitate data communication between two or more of the controller 30, componentry of the interference detection assembly 20 (e.g., one or more drones), the ride vehicle assembly 14, or another communication component. Such communication systems may be employed to facilitate line of sight communication, beyond line of sight communication, or both. For example, such communication systems may include multiple nodes or links configured to relay data between two end-points. These and other features of communication systems will be described in detail with reference to later drawings.

In accordance with the present disclosure, the memory circuitry 32 may store instructions thereon and the processing circuitry 34 may execute the instructions to perform various functions, such as initiating movement of the first movable show element 18 from the first position 24 to the second position 26. In response to detecting an overlap between the reach envelope 22 and the first show element 18, the interference detection assembly 20 may recommend a change to the timing of the movement of the first movable show element 18 to remedy the overlap, where the change may be implemented at the controller 30 of the ride system 10. For example, the overlap may be remedied by initiating the movement of the first show element 18 at an earlier predetermined time interval or at a later predetermined time interval.

As another example, the second movable show element 19 may be configured to move from a first position 36 to a second position 38 (e.g., without traversing the track 12). A curvilinear belt or rail 40 (e.g., electronically actuated curvilinear belt or rail) may be employed to enable movement of the second movable show element 19 between the first position 36 and the second position 38. Further, the controller 30 may be employed to control the movement of the second movable show element 19 from the first position 36 to the second position 38 at a pre-determined time interval and/or based on a position of the ride vehicle assembly 14 relative to the second movable show element 19. In response to detecting an overlap between the reach envelope 22 and the second show element 19, the interference detection assembly 20 may recommend a change to the timing of the movement of the second movable show element 19 to remedy the overlap, where the change may be implemented at the controller 30 of the ride system 10. For example, the overlap may be remedied by initiating the movement of the second show element 19 at an earlier predetermined time interval or at a later predetermined time interval.

In either instance of the first show element 18 or the second show element 19, the identified overlap(s) described above may additionally or alternatively be remedied by physically moving and/or re-sizing aspects of the ride system 10, such as the first movable show element 18 (or related componentry, such as the linear belt or rail 28), the second movable show element 19 (or related componentry, such as the curvilinear belt or rail 40), the track 12, the ride vehicle assembly 14, etc. As previously described, a recommendation for such remedy or remedies may be generated by the interference detection assembly 20 and, as described in detail with reference to later drawings, output or illustrated on a display of a control device.

As still another example, the interference detection assembly 20 may be configured to identify an overlap (or interference) between the reach envelope 22 and the stationary structure 16 (e.g., walls) adjacent to, or defining a part of, the ride system 10. For example, in some embodiments, such as embodiments in which the ride system 10 is a "dark ride," the stationary structure 16 may correspond to walls of a building. The interference detection assembly 20 may be configured to determine whether the reach envelope 22 overlaps with the stationary structure 16 at any point in the ride system 10, such as various regions 42 where the track 12 approaches the stationary structure 16 (e.g., walls). In response to detecting an overlap between the reach envelope 22 and the stationary structure 16, the interference detection assembly 20 may generate a notification recommending movement of the track 12 and/or the stationary structure 16, recommending a re-sizing of the track 12, the stationary structure 16, and/or the ride vehicle assembly 14 (and, thus, the corresponding reach envelope 22), or any combination thereof.

As previously described, in accordance with present embodiments, the interference detection assembly 20 may include a drone having a path (e.g., land path, air path, water path, space path) controlled generally to follow the track 12. For example, the path of the drone may be controlled (e.g., pre-programmed) to follow or substantially follow a centerline of the track 12 (e.g., within error margins or engineering tolerances) and/or such that the drone maintains a substantially constant distance (e.g., within error margins or engineering tolerances) from the track 12. In some embodiments, various indicators 44 (e.g., visual indicators) may be disposed along, or adjacent to, the track 12, and the drone may be configured to detect and follow the various indicators 44 (e.g., visual indicators) to guide the drone along the desired path. Use of the visual indicators 44 may be employed in addition to, or in the alternate of, a pre-programmed path executed by processing circuitry of the drone. Further, while the illustrated embodiment includes the track 12 and the visual indicators 44 distributed about the track 12, in other embodiments, the ride system 10 may not include the track 12. For example, the visual indicators 44 may be distributed along a path that the ride vehicle assembly 14 will ultimately travel (e.g., such that movement of the drone relative to the path is based at least in part on the drone's detection of the visual indicators 44).

In general, movement of the drone may be autonomous, semi-autonomous, or fully user-operable. Indeed, a path of the drone may be controlled via pre-programmed inputs, a remote controller, sensor feedback (e.g., relating to indicators positioned along a desired path and detected by the drone), or any combination thereof. The indicators 44 (e.g., visual indicators) may include, for example, specific colors, numbers, letters, graphics, QR codes, or other detectible features. Further, in some embodiments, the indicators 44 may be detected by other means. For example, the indicators 44 may correspond to beacons detected by the drone via wireless communication protocols, such as short-range wireless technology (e.g., Bluetooth) or other radio frequency (RF) technologies (e.g., RF transmitters and receivers).

Further, the path of the drone may be controlled (e.g., as described above) such that the drone travels at a substantially similar speed as the ride vehicle assembly 14 would travel along the track 12. In doing so, a timing of the path of the drone of the interference detection assembly 20 may be synchronized with a timing of the ride system 10, such as a timing of movement of the first movable show element 18 and the second movable show element 19. That is, the drone of the interference detection assembly 20 may complete a path (or cycle) around the track 12 in a substantially similar amount of time as the ride vehicle assembly 14 is designed to complete a loop along the track 12, and control of the movable show elements 18, 19 may be controlled to sync with the path (or cycle) of the drone.

The synchronized timing described above may facilitate accurate and time-dependent identifications of overlaps (or interferences) between the reach envelope 22 and various componentry of the ride system 10, such as the movable show elements 18, 19. In some embodiments, the communication circuitry 35 of the controller 30 may be employed to communicate with the drone to enable the above-described time synchronization, to instruct movement of the movable show elements 18, 19 based on the time synchronization, or any combination thereof. Detailed aspects of the above-described features, the drone of the interference detection assembly 20, and a control device corresponding to the drone of the interference detection assembly 20 are provided in detail below.

Figure 2:
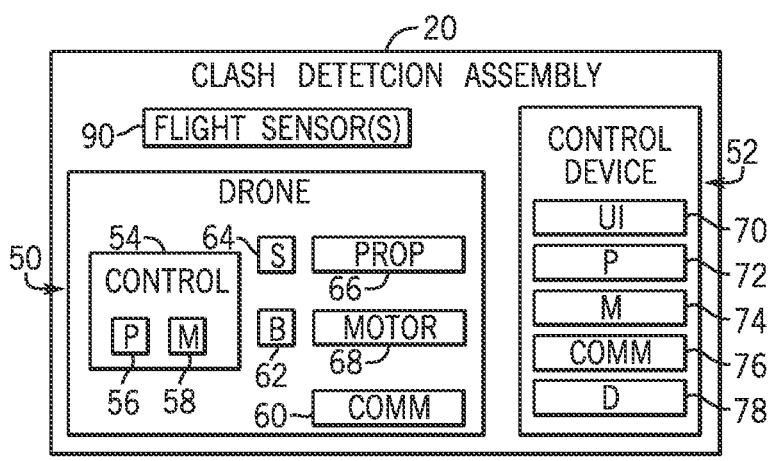
FIG. 2 is a block diagram of the interference detection assembly of FIG. 1, including a drone and a control device corresponding to the drone, in accordance with an aspect of the present disclosure.

FIG. 2 is a block diagram of an embodiment of the interference detection assembly 20 of FIG. 1, including a vehicle (e.g., drone 50) and a control device 52 associated with the vehicle (e.g., drone 50). As shown in FIG. 2, the drone 50 may include an integrated controller 54 (e.g., having processing circuitry 56 and memory circuitry 58), communication circuitry 60 (e.g., a transceiver), a battery 62 configured to power various aspects of the drone 50, a sensor assembly 64 (e.g., imaging sensor assembly), a propulsion assembly 66, and a motor assembly 68 configured to drive the propulsion assembly 66, among other features. Further, the control device 52 may include a user interface 70, processing circuitry 72, memory circuitry 74, communication circuitry 76 (e.g., a transceiver), and a display 78. In some embodiments, the display 78 and the user interface 70 may be integrated via a touchscreen.

Figure 3:
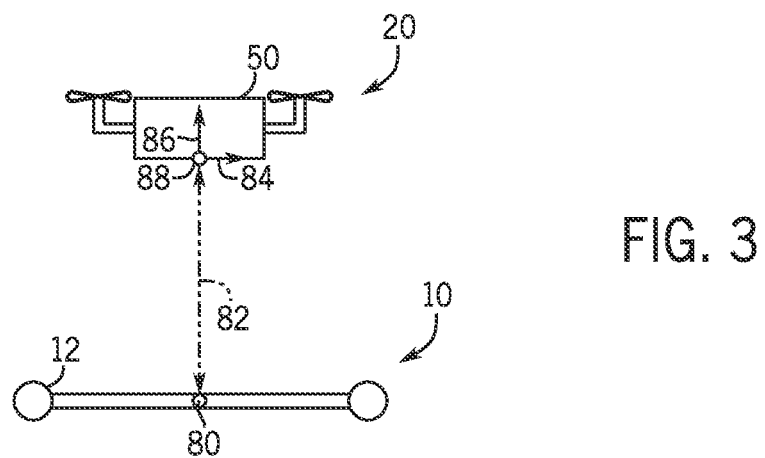
FIG. 3 is a schematic front view of the track of the ride system and a drone of the interference detection assembly of FIG. 1, in accordance with an aspect of the present disclosure.

In accordance with the present disclosure, the user interface 70 may be employed to receive inputs (e.g., from a user) defining the path (e.g., land path, air path, water path, space path) of the vehicle (e.g., the drone 50). While the drone 50 is described with respect to certain embodiments of the present disclosure, it should be understood that other vehicles (e.g., land vehicles, water vehicles, spacecraft, satellites) may be similarly employed. The inputs to the user interface 70 described above may be pre-programmed (e.g., prior to deployment of the drone on the path) or entered in real time (e.g., such that the control device 52 acts as a remote controller). For example, FIG. 3 is a schematic front view of an embodiment of the track 12 of the ride system 10 and the drone 50 of the interference detection assembly 20. The inputs received but the user interface 70 of the control device 52 of FIG. 2 may be employed to pre-program a path of the drone 50 such that the drone 50 substantially follows, as shown in FIG. 3, a centerline 80 of the track 12 of the ride system 10, such that the drone 50 maintains a substantially constant distance 82 from the track 12, and/or such that the drone 50 travels at a speed substantially similar to a speed of the ride vehicle assembly 14 of FIG. 1. That is, as shown in FIG. 3, movement and/or position of the drone 50 along an X-axis 84, a Y-axis 86, and a Z-axis 88 of a coordinate system may be controlled based on the inputs received by the control device 52 in FIG. 2. In the embodiment illustrated in FIG. 3, the drone 50 is untethered from the track 12, although the drone 50 may be tethered to the track 12 in other embodiments. Further, while the user interface 70 in FIG. 2 is shown as integrated with the control device 52, in another embodiment, the user interface 70 may be integrated with the vehicle (e.g., the drone 50).

Focusing again on FIG. 2, the communication circuitry 60 of the drone 50 may interface with the communication circuitry 76 of the control device 52 to receive the above-described inputs to the user interface 70 and/or the pre-programmed path corresponding to the above-described inputs. The communication circuitry 60 of the drone 50 and the communication circuitry 76 of the control device 52 may interface via a wireless or wired connection. For example, the wireless connection may correspond to personal area network (PAN) communication, such as Bluetooth, Wi-Fi communication, radio frequency (RF) communication, and the like. Additionally or alternatively, the wired connection may include any type of Universal Serial Bus (USB) connection, a Lightning connector, and the like. In some embodiments, sensors 90 of the interference detection assembly 20 may be employed to control a path of the drone 50. The sensors 90 may be employed in lieu of, or in addition to, the inputs configured to pre-program the path of the drone 50. The sensors 90 may be, for example, position sensors, velocity sensors, accelerometers, gyroscopes, imaging sensors, or the like, and may be integrated with the drone 50 or separate from the drone 50. In some embodiments, the sensors 90 may be integrated with the drone 50 and employed to detect various indicators (e.g., the indicators 44 in FIG. 1) disposed along the desired path of the drone 50, such that the drone 50 employs detection of the indicators to guide or assist a movement of the drone 50 along the desired path.

The motor assembly 68 of the drone 50 may be operated to drive propellers (e.g., blades) of the propulsion assembly 66 of the drone 50 into rotation. Further, actuators of the propulsion assembly 66 of the drone 50 may be operated to control an attitude and/or velocity of the drone 50. These features may be controlled such that the drone 50 follows the path (e.g., pre-programmed flight path) described above. As the drone 50 is operated to follow the above-described path, the sensor assembly 64 (e.g., imaging sensor assembly) of the drone 50 may capture images or imaging-related data surrounding the drone 50. For example, the sensor assembly 64 may include one or more cameras, one or more light detection and ranging (LIDAR) sensors, one or more radio detection and ranging (RADAR) sensors, one or more other types of imaging sensor, or any combination thereof. As previously described, the sensor data captured by the sensor assembly 64 and additional data indicative of the ride envelope 22 in FIG. 1 may be employed (e.g., by the controller 54 integrated with the drone 50 and/or the control device 52 of the interference detection assembly 20) to determine an overlap between the ride envelope 22 of FIG. 1 and an additional component of the ride system 10 of FIG. 1. The additional data indicative of the ride envelope 22 may be, for example, entered via inputs to the user interface 70 of the control device 52.

Figure 4:
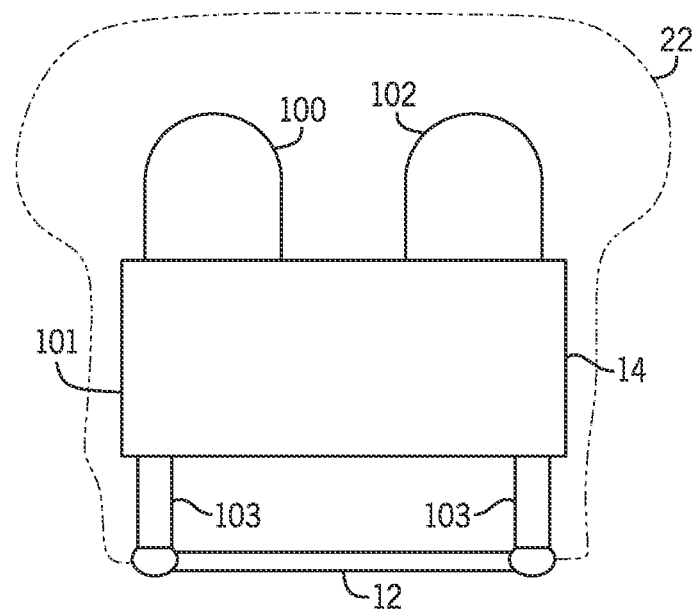
FIG. 4 is a schematic front view of a reach envelope associated with the ride vehicle assembly of the ride system of FIG. 1, in accordance with an aspect of the present disclosure.
Figure 5:
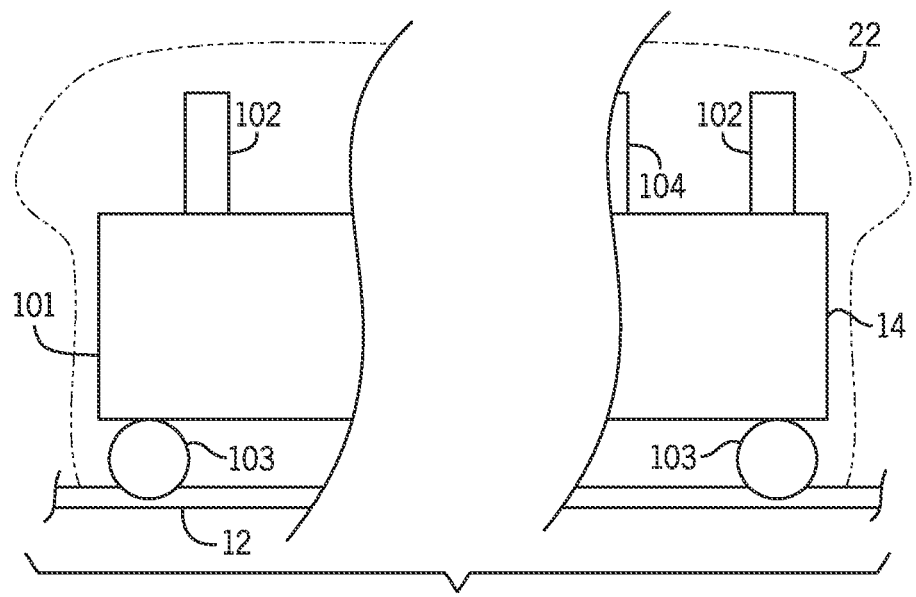
FIG. 5 is a schematic side view of a reach envelope associated with the ride vehicle assembly of the ride system of FIG. 1, in accordance with an aspect of the present disclosure.
Figure 6:
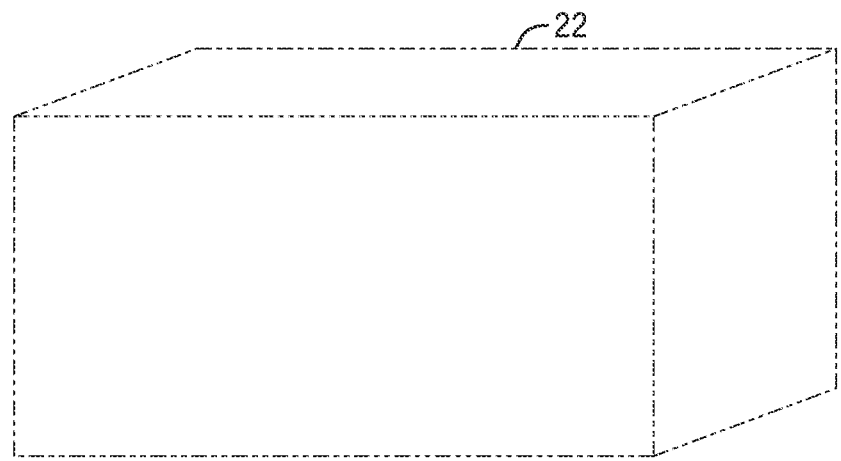
FIG. 6 is a schematic perspective view of a reach envelope associated with the ride vehicle assembly of the ride system of FIG. 1, in accordance with an aspect of the present disclosure.

FIGS. 4-6 include various views of the reach envelope 22 corresponding to the ride vehicle assembly 14 in FIG. 1. For example, FIG. 4 is a schematic front view of an embodiment of the reach envelope 22 associated with the ride vehicle assembly 14 of the ride system 10 of FIG. 1, FIG. 5 is a schematic side view of an embodiment of the reach envelope 22 associated with the ride vehicle assembly 14 of the ride system 10 of FIG. 1, and FIG. 6 is a schematic perspective view of an embodiment of the reach envelope 22 associated with the ride vehicle assembly 14 of the ride system 10 of FIG. 1.

Focusing first on FIG. 4, the ride vehicle assembly 14 is positioned on the track 12 and includes a body 101, a first seat 100 disposed in (or attached to) the body 101, a second seat 102 disposed in (or attached to) the body 101, and wheels 103 coupled to the body 101. A boundary of the reach envelope 22 may be defined by distances (e.g., safety margins) about the ride vehicle assembly 14. For example, the boundary of the reach envelope 22 may extend certain distances from the wheels 103, the body 101, and the seats 100, 102 of the ride vehicle assembly 14. As shown, the reach envelope 22 may resemble a muffin or mushroom, where an upper portion of the muffin or mushroom shape accounts for a largest possible reach of passengers in the first seat 100 and the second seat 102 of the ride vehicle assembly 14 (e.g., including extensions of personal items such as cell phones, cameras, etc.). That is, the above-described distances (e.g., safety margins) may take into account such reach of the passengers.

Focusing now on FIG. 5, illustrating a side view of an embodiment of the reach envelope 22, the ride vehicle assembly 14 is positioned on the track 12 and includes the second seat 102, a third seat 104 behind the second seat 102, and a fourth seat 106 toward a back of the ride vehicle assembly 14. Although the first seat 100 from FIG. 4 is not shown in FIG. 5 due to the illustrated perspective, it should be understood that the first seat 100 may be positioned beside the second seat 102. A boundary of the reach envelope 22 may be defined by distances (e.g., safety margins) about the ride vehicle assembly 14. For example, the boundary of the reach envelope 22 may extend certain distances from the wheels 103, the body 101, and the seats 102, 104, 106 of the ride vehicle assembly 14 illustrated in FIG. 5. As shown, the reach envelope 22 may resemble a muffin or mushroom, where an upper portion of the muffin or mushroom shape accounts for the largest possible reach of passengers in the seats 102, 104, 106 of the ride vehicle assembly 14 (e.g., including extensions of personal items such as cell phones, cameras, etc.). That is, the above-described distances (e.g., safety margins) may take into account such reach of the passengers.

In other embodiments, such as an embodiment of the reach envelope 22 illustrated in FIG. 6, the reach envelope 22 may include a rectangular shape (e.g., rectangular prism), where an entirety of a size of the ride vehicle assembly 14 (plus a safety margin) fits within the rectangular shape. In other embodiments, the reach envelope 22 may resemble a cylindrical shape (e.g., cylinder) where an entirety of a size of the ride vehicle assembly 14 (plus a safety margin) fits within the cylindrical shape. The rectangular and/or cylindrical shapes, for example, may reduce a processing power associated with detecting an overlap between the reach envelope 22 and another component of the ride system 10. Further, the rectangular and/or cylindrical shapes may be sized to account for the largest possible reach of passengers (e.g., including extensions of personal items such as cell phones, cameras, etc.), as previously described.

It should be understood that the reach envelope 22 and corresponding parameters (e.g., length, width, height, area, volume) may be known by the interference detection assembly 20 of FIG. 1, and an overlap between the reach envelope 22 and componentry of the ride system 10 of FIG. 1 may be determined by the interference detection assembly 20 without a presence of the ride vehicle assembly 14 on the track 12 of FIG. 1. In some embodiments, data indicative of the reach envelope 22 may be entered to the control device 52 of the interference detection assembly 20 in FIG. 2, as previously described, and employed by the control device 52 to detect the above-described overlap.

Figure 7:
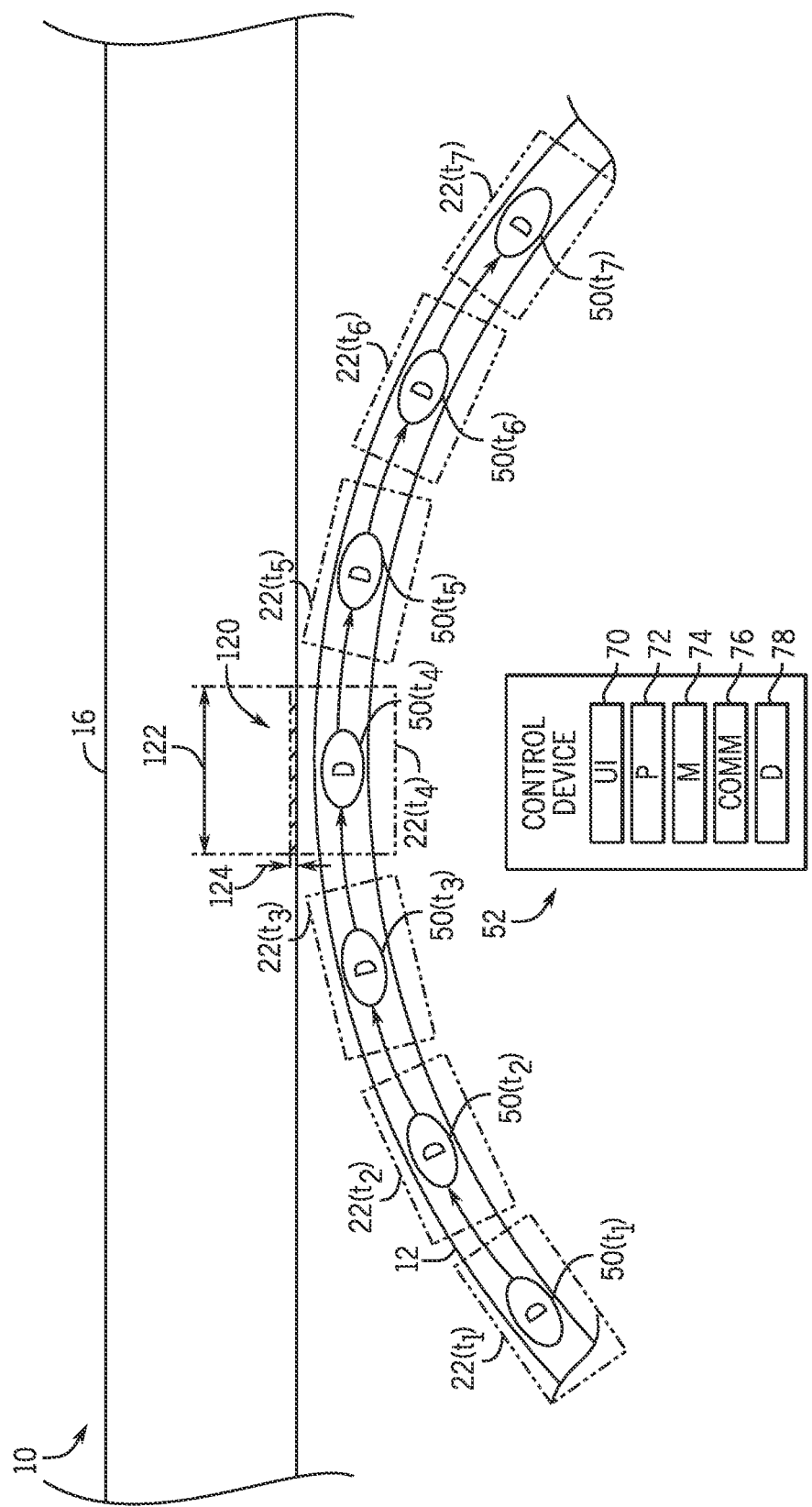
FIG. 7 is a schematic top-down view of the overlap detected by the interference detection assembly of FIG. 1, where the overlap is between the stationary structure of the ride system of FIG. 1 and the reach envelope associated with the ride vehicle assembly of the ride system of FIG. 1, in accordance with an aspect of the present disclosure.

FIG. 7 is a schematic top-down view of an embodiment of an overlap 120 detected by the interference detection assembly 20 of FIG. 1, where the overlap 120 is between the stationary structure 16 of the ride system 10 of FIG. 1 and the reach envelope 22 associated with the ride vehicle assembly 14 of the ride system 10 of FIG. 1. As shown, the drone 50 may be configured to fly or otherwise move along a path (e.g., land path, air path, water path, space path), such as a path corresponding to a ride path of the track 12. Thus, the drone 50 is shown in the illustrated embodiment at various moments in time, including a first time ($t_1$), a second time ($t_2$), a third time ($t_3$), a fourth time ($t_4$), a fifth time ($t_5$), a sixth time ($t_6$), and a seventh time ($t_7$). The drone 50 may communicate sensor data captured by a sensor assembly 64 of the drone 50, as previously described, to the control device 52. The control device 52 may also receive (or include stored in the memory circuitry 74 thereof) additional data indicative of the reach envelope 22. The control device 52 may determine, based on the sensor data and the additional data indicative of the reach envelope 22, whether the reach envelope 22 overlaps (or interferences) with the stationary structure 16. For example, the control device 52 may determine that the reach envelope 22 does not overlap with the stationary structure 16 at $t_1$, $t_2$, $t_3$, $t_5$, $t_6$, and $t_7$.

Further, the control device 52 may determine that the reach envelope 22 does overlap with the stationary structure 16 at $t_4$, as shown. In other words, the overlap 120 between the reach envelope 22 and the stationary structure 16 may occur at $t_4$ during the path or cycle of the drone 50 along the track 12 of the ride system 10. In addition to identifying the overlap 120 and corresponding timing at $t_4$, the control device 52 may determine an extent of the overlap 120 based on the sensor data and the additional data indicative of the reach envelope 22. For example, the control device 52 may determine a length 122 of the overlap 120, a thickness or width 124 of the overlap 120, a height of the overlap 120 (not shown due to illustrated perspective, but transverse to both the length 122 and the width 124), an area 121 of the overlap, a volume of the overlap 120, or any combination thereof.

Figure 8:
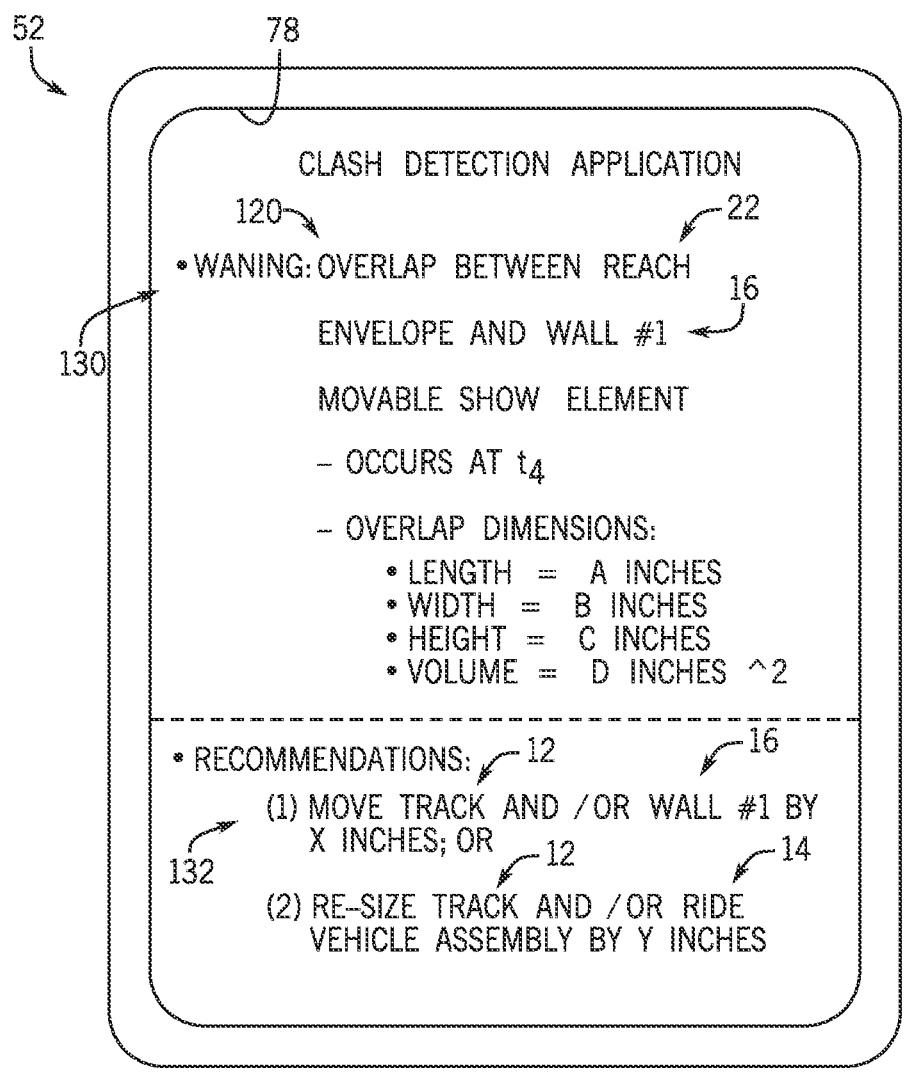
FIG. 8 is a schematic view of a control device of the interference detection assembly of FIG. 1, the control device having a display configured to illustrate an indication of the overlap of FIG. 7 and a recommendation for remedying the overlap, in accordance with an aspect of the present disclosure.

As previously described, the display 78 of the control device 52 may be configured to illustrate, display, or output various information related to the overlap 120 described above. For example, FIG. 8 is a schematic view of an embodiment of the control device 52 of the interference detection assembly 20 of FIG. 1, including the display 78 configured to illustrate an indication of the overlap 120 of FIG. 7 and a recommendation for remedying the overlap 120. In the illustrated embodiment, the display 78 presents a warning section 130 including information indicative of the overlap 120. The information indicative of the overlap 120 may include, for example, an identification of the location of the overlap 120 or the componentry (e.g., the stationary structure 16 or wall) that overlaps with the reach envelope 22, an indication of the timing of the overlap 120 (e.g., $t_4$), and/or an extent of the overlap 120 (e.g., dimensional data, which may include the width 124, the length 122, the height extending transverse to the width 124 and the length 122, and/or volume), as shown. Further, the display 78 in FIG. 8 presents a recommendations section 132 including one or more recommendations for remedying the overlap 120 identified in the warning section 130. For example, the recommendations may include movement of componentry of the ride system 10 (e.g., the track 12 and/or the stationary structure 16 or wall) or resizing of componentry of the ride system 10 (e.g., the track 12 and/or the ride vehicle assembly 14), as shown.

FIGS. 7 and 8, described in detail above, relate to circumstances whereby the reach envelope 22 overlaps with the stationary structure 16 (e.g., a wall) of the ride system 10 of FIG. 1. Other instances of the overlap 120 are also possible. For example, FIG. 9 is a schematic top-down view of an embodiment whereby the overlap 120 is detected by the interference detection assembly 20 of FIG. 1 between the reach envelope 22 and one of the movable show elements 18, 19 of FIG. 1, such as the first movable show element 18.

As previously described, the controller 30 may operate movement of the first movable show element 18 between various positions (e.g., from the first position 24, to an intermediate position 140, and then to the second position 26). Further, the control device 52 (and/or a controller integrated with the drone 50) may operate to control a path of the drone 50. Further still, a timing of movement of the first movable show element 18 and the path of the drone 50 may be synchronized. For example, the path of the drone 50 may be controlled to substantially mimic (e.g., in position and speed) the future ride path of the ride vehicle assembly 14 of the ride system 10 (e.g., relative to the track 12). In this way, any overlaps between the reach envelope 22 and the first movable show element 18, which may be dependent on a timed sequence, can be identified by the control device 52. For example, as previously described, the drone 50 may communicate sensor data captured by a sensor assembly 64 of the drone 50 to the control device 52. The control device 52 may also receive (or include stored in the memory circuitry 74 thereof) additional data indicative of the reach envelope 22. Based on the sensor data and the additional data indicative of the reach envelope 22, the control device 52 may detect the overlap 120 as outlined below.

Figure 9:
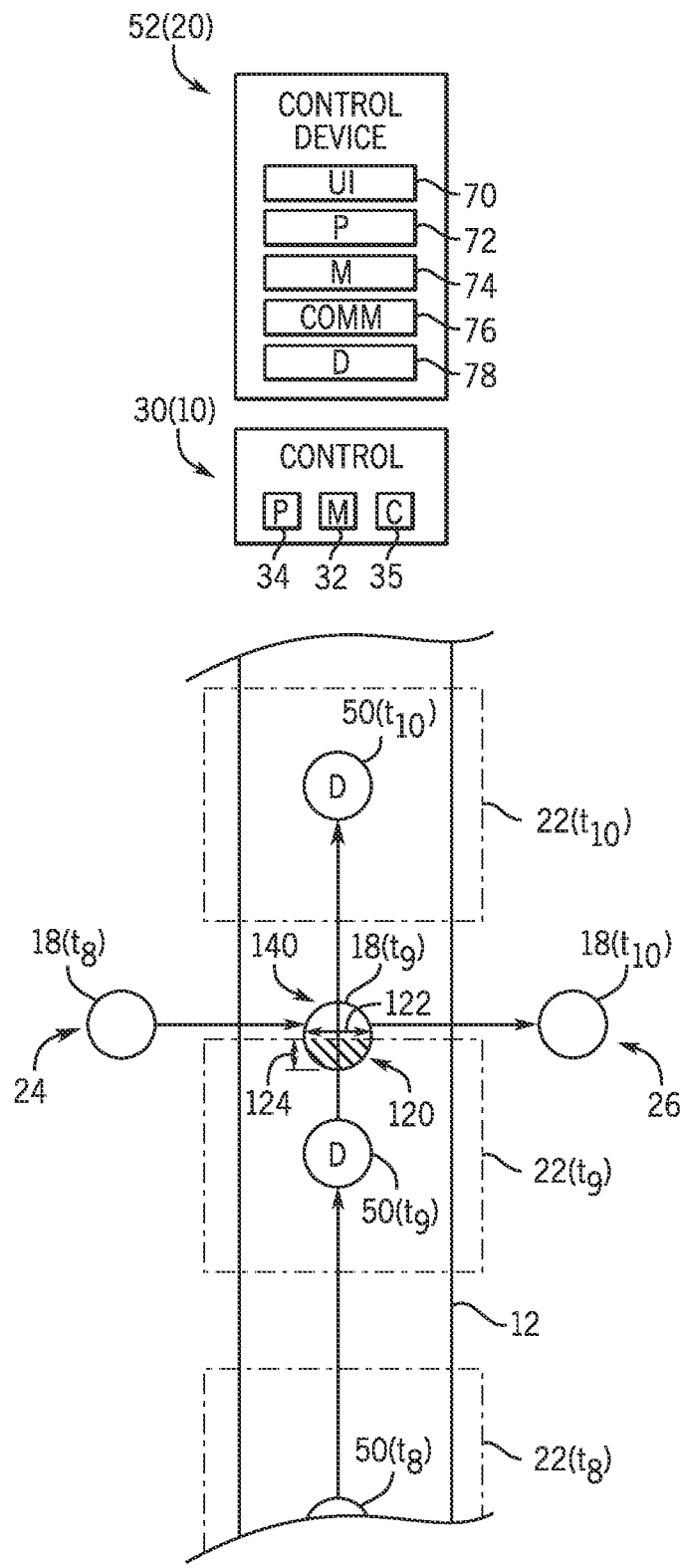
FIG. 9 is a schematic top-down view of the overlap detected by the interference detection assembly of FIG. 1, where the overlap is between one of the movable show elements of the ride system of FIG. 1 and a reach envelope associated with the ride vehicle assembly of the ride system of FIG. 1, in accordance with an aspect of the present disclosure.

For example, three time steps are shown in the illustrated embodiment, including $t_8$, $t_9$, and $t_{10}$ ($t_1$-$t_7$ are included in FIG. 7 and, thus, excluded in FIG. 9 for clarity). The first movable show element 18 is in the first position 24 at $t_8$, the intermediate position 140 at $t_9$, and the second position 26 at $t_{10}$. Further, because the reach envelope 22 at to overlaps with the first movable show element 18 at to, the overlap 120 between the reach envelope 22 and the first movable show element 18 is detected (e.g., by the control device 52 or the drone 50). Additionally, an extent of the overlap 120 (e.g., the length 122, the width 124, the height extending transverse to the length 122 and the width 124, the area 121, and/or the volume) may be determined, as previously described.

The overlap 120 illustrated in FIG. 9 and described above between the reach envelope 22 and the first movable show element 18 may be remedied by initiating movement of the first movable show element 18 at a different moment in time such that the first movable show element 18 is in the intermediate position 140 at $t_8$ or at $t_{10}$, for example, as opposed to $t_9$. Indeed, at $t_8$ the reach envelope 22 is well upstream of the intermediate position 140 of the first movable show element 18, and at $t_{10}$ the reach envelope 22 is well downstream of the intermediate position 140 of the first movable show element 18. Accordingly, by changing the relative timing of the path of the drone 50 (which, as previously stated, is configured to mimic a future ride path of a ride vehicle assembly 14 along the track 12) and the actuation of the first movable show element 18, the overlap 120 illustrated in FIG. 9 may be remedied. Of course, in certain embodiments and as previously described, overlaps between the reach envelope 22 and movable show elements, such as the first movable show element 18 or the second movable show element 19 in FIG. 1, may be remedied by changing positions of various componentry and/or resizing of various componentry.

Figure 10:
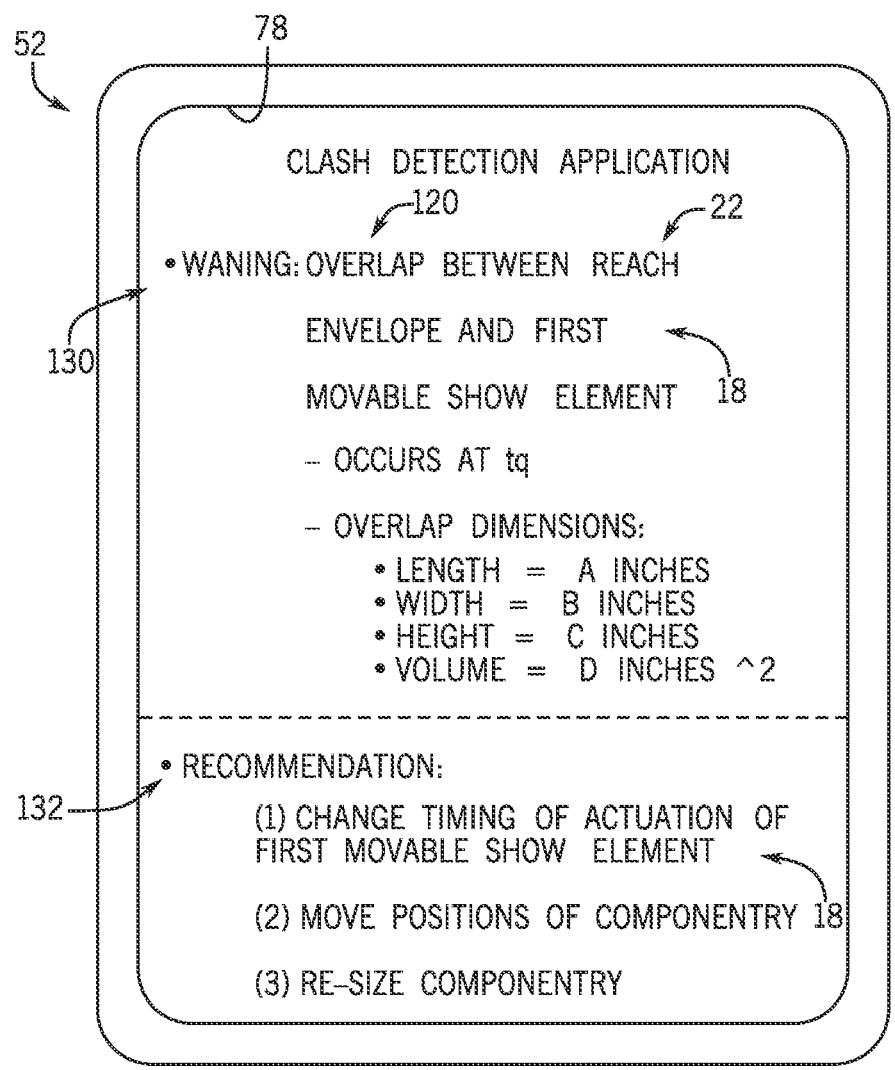
FIG. 10 is a schematic view of a control device of the interference detection assembly of FIG. 1, the control device having a display configured to illustrate an indication of the overlap of FIG. 9 and a recommendation for remedying the overlap, in accordance with an aspect of the present disclosure.

As previously described, the display 78 of the control device 52 may be configured to illustrate, display, or output various information related to the overlap 120 described above. For example, FIG. 10 is a schematic view of an embodiment of the control device 52 of the interference detection assembly 20 of FIG. 1, including the display 78 configured to illustrate an indication of the overlap 120 of FIG. 9 and a recommendation for remedying the overlap 120. In the illustrated embodiment, like in FIG. 8, the display 78 presents the warning section 130 including information indicative of the overlap 120. The information indicative of the overlap 120 may include, for example, an identification of the location of the overlap 120 or the componentry (e.g., the first movable show element 18) that overlaps with the reach envelope 22, an indication of the timing of the overlap 120 (e.g., $t_9$), and/or an extent of the overlap 120 (e.g., dimensional data, which may include the width 124, the length 122, the height extending transverse to the width 124 and the length 122, and/or volume), as shown. Further, like in FIG. 8, the display 78 in FIG. 10 presents the recommendations section 132 including one or more recommendations for remedying the overlap 120 identified in the warning section 130. For example, the recommendations may include changing a timing of actuation of componentry (e.g., the first movable show element 18), movement of positions of various componentry, and/or re-sizing of various componentry, as previously described.

Figure 11:
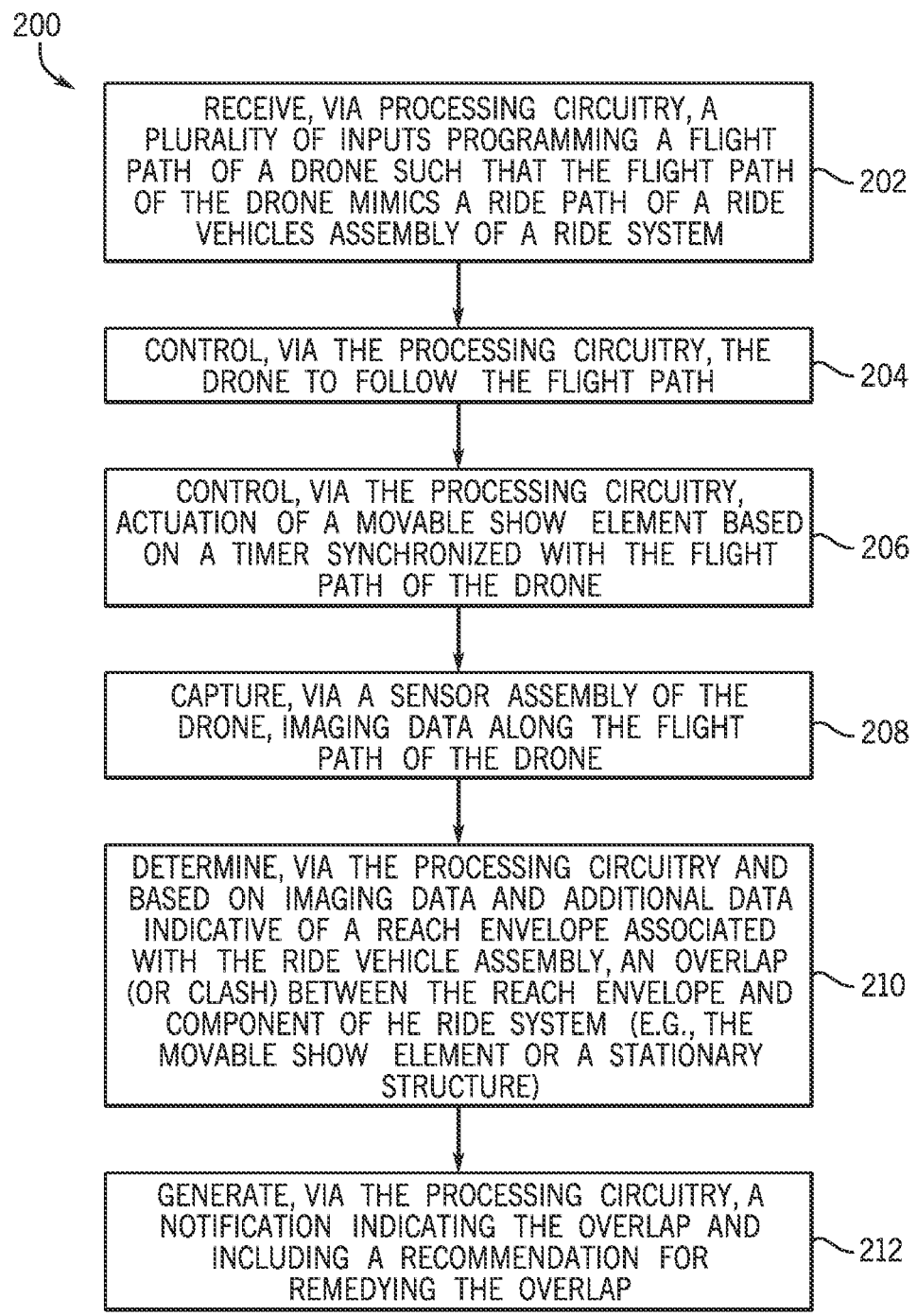
FIG. 11 is a process flow diagram illustrating a method of operating the interference detection assembly of FIG. 1, in accordance with an aspect of the present disclosure.

FIG. 11 is a process flow diagram illustrating an embodiment of a method 200 of operating the interference detection assembly 20 of FIG. 1. In the illustrated embodiment, the method 200 includes receiving (block 202), via processing circuitry, inputs programming a path of a drone such that the path of the drone (e.g., flight path, land path, water path) mimics a travel path (e.g., corresponding to a ride path, track, railway, automobile path, walking path, water vehicle path, air vehicle path) of a vehicle (e.g., locomotive, ride vehicle of a ride system, automobile, air or space vehicle). For example, the path of the drone (e.g., air vehicle, space vehicle, land vehicle, water vehicle may be pre-programmed such that the drone is configured to follow the path for one cycle of a ride path of a ride system (e.g., relative to the track thereof). It should be noted, as previously described, that movement of the drone may be autonomous, semi-autonomous, fully user-operable, and the like. For example, a path of the drone may be controlled via pre-programmed inputs, a remote controller, sensor feedback (e.g., relating to indicators positioned along a desired path and detected by the drone), or any combination thereof.

As shown, the method 200 includes controlling (block 204), via the processor (e.g., processing circuitry), the drone to follow the path programmed via block 202. As previously described, in some embodiments, visual indicators may be disposed about the track and detected by the drone to enable the drone to follow a path corresponding to the visual indicators. The visual indicators may be used in addition to, or in the alternate of, inputs programming the path of the drone described above with respect to block 202.

The method 200 also includes controlling (block 206), via the processing circuitry, actuation of a movable show element based on a timer synchronized with the path of the drone. For example, as previously described, a speed of the drone may be configured (e.g., via the pre-programmed path) to mimic a future speed of the ride vehicle assembly. Thus, the movable show element may be controlled (e.g., electrically controlled) to actuate from a first position to a second position based on the position and/or speed of the drone and in accordance with a synchronized clock. In this way, the movable show element may move when the drone is in the same or similar position that the ride vehicle assembly would be if the ride vehicle assembly were traversing the track in a normal ride sequence.

The method 200 also includes capturing (block 208), via a sensor assembly of the drone, sensor data along the path of the drone. As previously described, the sensor assembly may include and capture the sensor data via one or more cameras, one or more LIDAR sensors, one or more RADAR sensors, one or more of some other type(s) of imaging-related sensor(s), or any combination thereof. The method 200 also includes determining (block 210), via the processing circuitry and based on sensor data and additional data indicative of a reach envelope associated with the ride vehicle assembly, an overlap (or interference) between the reach envelope and componentry of the ride system. For example, the processing circuitry may detect an overlap between the reach envelope and a stationary structure of the ride system, the reach envelope and the movable show element, or both.

The method 200 also includes generating (block 212), via the processing circuitry, a notification indicating the overlap and including a recommendation for remedying the overlap. In some embodiments, the notification may include an extent of the overlap (e.g., dimensional data, timing data, etc.). Further, the recommendation for remedying the overlap may include, for example, moving positions of certain componentry of the ride system, re-sizing certain componentry of the ride system, or changing a timing of actuation/movement of certain componentry (e.g., the movable show element) of the ride system.

Figure 12:
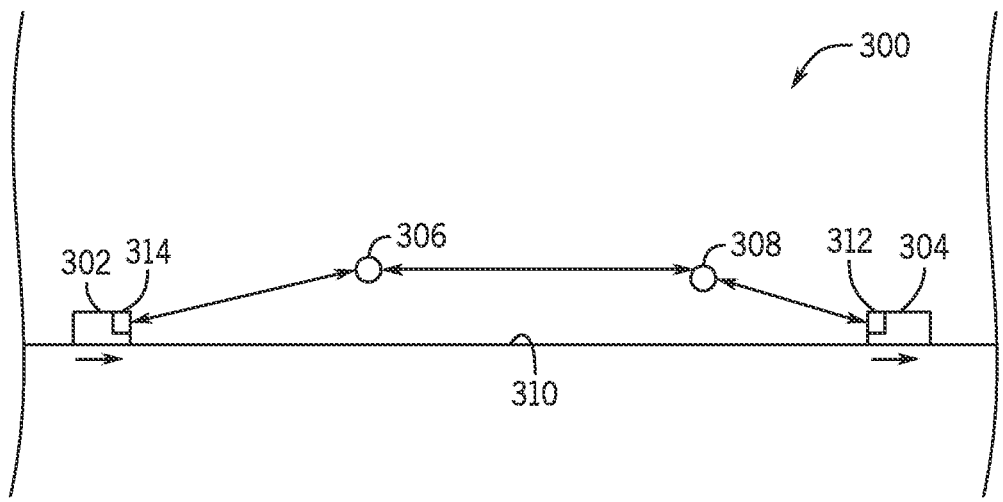
FIG. 12 is a schematic side view of a line of sight communication system having componentry that may be employed in any of FIGS. 1-11, in accordance with an aspect of the present disclosure.
Figure 13:
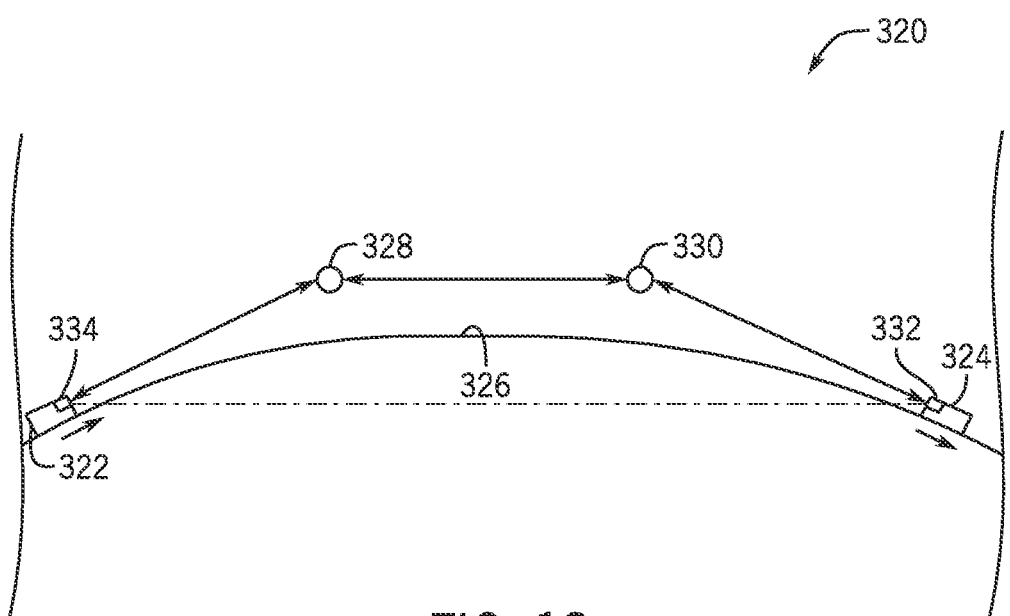
FIG. 13 is a schematic side view of a beyond line of sight communication system having componentry that may be employed in any of FIGS. 1-11, in accordance with an aspect of the present disclosure.

FIGS. 12 and 13 illustrate various communication system componentry that may be employed in any of FIGS. 1-11. For example, FIG. 12 is a schematic side view of a line of sight communication system 300 and FIG. 13 is a schematic side view of a beyond line of sight communication system 320. The communication systems 300, 320 (or componentry thereof) in FIGS. 12 and 13 may be employed in any of FIGS. 1-11 and/or in other long-range applications, such as railroad implementations, automobile implementations, and the like. Focusing first on FIG. 12, the line of sight communication system 300 is configured to establish communication between a first vehicle 302 and a second vehicle 304 via nodes (or hubs) 306 and 308. Although two nodes 306, 308 are shown in the illustrated embodiment, any number of nodes may be employed (e.g., one node or three or more nodes).

In accordance with the present disclosure, the second vehicle 304 may correspond to a surveying vehicle traveling along a path 319 ahead of the first vehicle 302. That is, the second vehicle 304 may be configured to employ the same or similar technologies described above with respect to FIGS. 1-11 to determine whether a reach envelope corresponding to the first vehicle 302 interferences with objects adjacent to the path 310 prior to the first vehicle 302 reaching the objects. Although certain embodiments described above may employ interference detection features prior to a ride vehicle traveling along a path (e.g., track), it should be understood that, in certain other embodiments, interference detection features may be employed ahead of the ride vehicle as the ride vehicle travels along the path (e.g., as the first vehicle 302 illustrated in FIG. 12 travels along the path 310).

In the illustrated embodiment, a line of sight exists between the first vehicle 302 and the second vehicle 304. However, the first vehicle 302 and the second vehicle 304 may be spaced by a distance that exceeds a range of communication therebetween (e.g., based on the communication technology or protocols employed in the line of sight communication system 300). Accordingly, the nodes 306, 308 may act as relays for data communication between the first vehicle 302 and the second vehicle 304. As an example, the second vehicle 304 may detect an interference between a reach envelope corresponding to the first vehicle 302 and an object adjacent the path 310. The second vehicle 304 may transmit (e.g., via transceiver 312) a notification which is received by the node 308, relayed by the node 308 to the node 306, and relayed by the node 306 to a transceiver 314 of the first vehicle 302. It should be noted that, although the first vehicle 302 and the second vehicle 304 are disposed on the path 310 in FIG. 12, in another embodiment, the first vehicle 302 and/or the second vehicle 304 may be a drone, aircraft, spacecraft, or some other type of vehicle. Further, it should be understood that the nodes 306, 308 may be ground stations (e.g., cellular towers, stations, or networks, underground stations, etc.), aircraft, drones, spacecraft, satellites, etc.

Focusing now on FIG. 13, the beyond line of site communication system 320 may be configured to establish communication between a first vehicle 322 and a second vehicle 324 where a line of sight does not exist between the first vehicle 322 and the second vehicle 324. For example, a curvature of a path 326 between the first vehicle 322 and the second vehicle 324 may block a line of sight therebetween. As another example, a building may block a line of sight between the first vehicle 322 and the second vehicle 324. As shown, the beyond line of sight communication system 320 may include nodes (or hubs) 328, 330 that relay data communication between the first vehicle 322 and the second vehicle 324. As an example, the second vehicle 324 may detect an interference between a reach envelope corresponding to the first vehicle 322 and an object adjacent the path 326. The second vehicle 324 may transmit (e.g., via transceiver 332) a notification which is received by the node 330, relayed by the node 330 to the node 328, and relayed by the node 328 to a transceiver 334 of the first vehicle 322. It should be noted that, although the first vehicle 322 and the second vehicle 324 are disposed on the path 326 in FIG. 12, in another embodiment, the first vehicle 322 and/or the second vehicle 324 may be a drone, aircraft, spacecraft, or some other type of vehicle. Further, it should be understood that the nodes 328, 330 may be ground stations, aircraft, drones, spacecraft, satellites, etc.

Further still, the communication systems 300, 320 in FIGS. 12 and 13, respectively, may be employed to relay communications between a vehicle (e.g., a drone) and a non-vehicle component, such as a control/processing device that is not necessarily integrated with a vehicle. In general, the communication systems 300, 320 in FIGS. 12 and 13 may be employed to relay, between two control devices, communications relating to detection of an interference between a structure adjacent a path and a reach envelope of a vehicle, as previously described. It should be noted that "a processor," as used herein, may refer to one or more processors. Likewise, "processing circuitry," "processor system," "processor assembly," and the like may be used herein to refer to one or more processors. Similarly, "a memory," as used herein, may refer to one or more memories. Likewise, "memory circuitry," "memory system," "memory assembly," and the like may be used herein to refer to one or more memories.

While only certain features have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park attraction system, comprising:
   one or more travel paths configured to guide one or more ride vehicle assemblies thereon; and
   an interference detection assembly comprising one or more drones, a sensor assembly disposed on at least one of the one or more drones, one or more memories storing instructions thereon, and one or more processors configured to execute the instructions to:
      control a path of the one or more drones relative to the one or more travel paths;
      receive sensor data from the sensor assembly and corresponding to an environment surrounding the one or more drones;
      detect, based on the sensor data, an overlap between a reach envelope corresponding the one or more ride vehicle assemblies and at least one additional component of the amusement park attraction system; and
      generate one or more notifications indicative of the overlap.

2. The amusement park attraction system of claim 1, comprising one or more movable show elements corresponding to the at least one additional component of the amusement park attraction system.

3. The amusement park attraction system of claim 1, comprising one or more structures corresponding to the at least one additional component of the amusement park attraction system.

4. The amusement park attraction system of claim 1, wherein the one or more processors are configured to execute the instructions to:
   determine an extent of the overlap;
   determine, based on the extent of the overlap, one or more recommendations for remedying the overlap; and
   generate an additional notification indicative of the one or more recommendations for remedying the overlap.

5. The amusement park attraction system of claim 1, wherein the one or more processors are configured to execute the instructions to:
   determine an extent of the overlap;
   determine, based on the extent of the overlap, one or more recommendations for remedying the overlap by moving the one or more travel paths, the at least one additional component, or both; and
   generate an additional notification indicative of the one or more recommendations for remedying the overlap.

6. The amusement park attraction system of claim 1, comprising one or more movable elements corresponding to the at least one additional component of the amusement park attraction system, wherein the one or more processors are configured to:
   determine one or more recommendations for remedying the overlap by changing a timing of a controlled movement of the one or more movable show elements; and
   generate an additional notification indicative of the one or more recommendations for remedying the overlap.

7. The amusement park attraction system of claim 1, wherein the one or more processors are configured to execute the instructions to control the path of the one or more drones relative to the one or more travel paths such that the one or more drones travel substantially along a centerline of the one or more travel paths.

8. The amusement park attraction system of claim 1, wherein the one or more processors are configured to execute the instructions to control the path of the one or more drones relative to the one or more travel paths such that the one or more drones maintain a substantially constant distance from the one or more travel paths.

9. The amusement park attraction system of claim 1, wherein the sensor assembly comprises one or more cameras, one or more light detection and ranging (LIDAR) sensors, one or more radio detection and ranging (RADAR) sensors, or any combination thereof.

10. The amusement park attraction system of claim 1, comprising a control device having a display configured to illustrate the notification.

11. The amusement park attraction system of claim 1, comprising a user interface configured to receive one or more inputs, wherein the one or more processors are configured to execute the instructions to control the path of the one or more drones relative to the one or more travel paths based at least in part on the one or more inputs.

12. An interference detection system for an amusement park attraction, comprising:

one or more drones having a sensory assembly disposed thereon;
one or more memories storing instructions thereon; and
one or more processors configured to execute the instructions to:
control a pre-programmed path of the one or more drones relative to one or more ride paths of the amusement park attraction;
receive, from the sensor assembly, sensor data corresponding to an environment surrounding the one or more drones; and
detect, based on the sensor data and additional data indicative of a reach envelope of one or more ride vehicle assemblies configured to traverse the one or more ride paths, one or more interferences between the reach envelope and one or more additional components of the amusement park attraction.

13. The interference detection system of claim 12, wherein the sensor assembly comprises one or more cameras, one or more light detection and ranging (LIDAR) sensors, one or more radio detection and ranging (RADAR) sensors, or any combination thereof.

14. The interference detection system of claim 12, wherein the one or more processors are configured to execute the instructions to detect, based on the sensor data and the additional data indicative of the reach envelope, the one or more interferences between the reach envelope and one or more movable show elements corresponding to the one or more additional components of the amusement park attraction.

15. The interference detection system of claim 14, wherein the one or more processors are configured to execute the instructions to:
determine one or more recommendations for remedying the one or more interferences between the reach envelope and the one or more movable show elements corresponding to the one or more additional components of the amusement park attraction, wherein the one or more recommendations include a proposed change to a timing of a movement of the one or more movable show elements; and
generate one or more notifications indicating the one or more interferences and indicating the one or more recommendations for remedying the one or more interferences.

16. The interference detection system of claim 12, wherein the one or more processors are configured to execute the instructions to:
determine an interference extent in the form of a length, a width, a height, an area, or a volume of the one or more interferences between the reach envelope and the additional component of the amusement park attraction; and
generate one or more notifications indicating the one or more interferences and the interference extent.

17. One or more tangible, non-transitory, computer-readable media storing instructions thereon that, when executed by one or more processors, are configured to cause the one or more processors to:
control a path of one or more vehicles relative to one or more paths;
receive, from a sensor assembly disposed on the one or more vehicles, sensor data corresponding to an environment surrounding the one or more vehicles;
detect, based on the sensor data and based on reach envelope data indicative of a reach envelope corresponding to one or more additional vehicles configured to move along the one or more paths, one or more interferences between the reach envelope and at least one structure adjacent the one or more paths; and
generate one or more notifications indicative of the one or more interferences.

18. The one or more tangible, non-transitory, computer-readable media of claim 17, wherein the instructions, when executed by the one or more processors, are configured to cause the one or more processors to:
determine, based on the sensor data and the reach envelope data, an extent of the one or more interferences between the reach envelope and the at least one structure adjacent the one or more paths; and
generate an additional notification indicative of the extent of the one or more interferences.

19. The one or more tangible, non-transitory, computer-readable media of claim 17, wherein the instructions, when executed by the one or more processors, are configured to cause the one or more processors to:
determine one or more recommendations for remedying the one or more interferences by changing a timing of a controlled movement of one or more movable show elements corresponding to the at least one structure; and
generate an additional notification indicative of the one or more recommendations.

20. The one or more tangible, non-transitory, computer-readable media of claim 17, wherein the instructions, when executed by the one or more processors, are configured to cause the one or more processors to relay data indicative of the one or more notifications from the one or more vehicles to a node, and relay the data indicative of the one or more notifications from the node to the one or more additional vehicles.

* * * * *